United States Patent
Berens et al.

(10) Patent No.: US 7,062,143 B1
(45) Date of Patent: Jun. 13, 2006

(54) MODULAR MECHANISM FOR PROTECTING FIBER OPTIC CABLES

(75) Inventors: Jessica Rose Berens, Rochester, MN (US); Don Alan Gilliland, Rochester, MN (US); Cary Michael Huettner, Rochester, MN (US); Nathan David Karl, Rochester, MN (US); Joseph Kuczynski, Rochester, MN (US); Mark David Pfeifer, Rochester, MN (US); Matthew Carl Zehrer, Saint Paul, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/117,616

(22) Filed: Apr. 28, 2005

(51) Int. Cl.
*G02B 6/00* (2006.01)
*G02B 6/44* (2006.01)
*F16C 11/06* (2006.01)

(52) U.S. Cl. .................. 385/136; 385/107; 385/109; 385/113; 385/134; 403/56

(58) Field of Classification Search ................ 385/136, 385/107, 109, 113
See application file for complete search history.

(56) References Cited

U.S. PATENT DOCUMENTS

| | | | |
|---|---|---|---|
| 5,649,043 A | 7/1997 | Adams et al. | |
| 6,039,081 A * | 3/2000 | Albert | 138/120 |
| 6,356,696 B1 * | 3/2002 | Bakker et al. | 385/134 |
| 6,571,042 B1 | 5/2003 | Kordahi | |
| 2002/0108644 A1 * | 8/2002 | Hoadley et al. | 134/172 |
| 2002/0131749 A1 | 9/2002 | Swenson et al. | |
| 2003/0165307 A1 | 9/2003 | Liden | |
| 2004/0005123 A1 | 1/2004 | Seo et al. | |
| 2005/0095406 A1 * | 5/2005 | Gunzel et al. | 428/190 |
| 2005/0141821 A1 * | 6/2005 | Loch et al. | 385/88 |

FOREIGN PATENT DOCUMENTS

| | | | |
|---|---|---|---|
| DE | 29908988 U | * | 8/1999 |
| WO | WO 0196921 A2 | | 12/2001 |

* cited by examiner

*Primary Examiner*—Frank G. Font
*Assistant Examiner*—Charlie Peng
(74) *Attorney, Agent, or Firm*—Joan Pennington

(57) ABSTRACT

A method and modular mechanism are provided for protecting fiber optic cables. The modular mechanism includes an inner member for receiving the fiber optic cable, and an outer container receiving and retaining the inner member, such as, an inner tube and outer tube. The inner member and the outer container have predefined shapes to create an interference with each other, limiting a bend radius of the fiber optic cable.

18 Claims, 8 Drawing Sheets

MODULAR MECHANISM FOR PROTECTING FIBER OPTIC CABLES

FIELD OF THE INVENTION

The present invention relates generally to optical fibers and cables, and more particularly, relates to a method and mechanism for protecting and shielding fiber optic cables and for limiting a bend radius of a fiber optic cable, while at the same time allowing for free movement where required.

DESCRIPTION OF THE RELATED ART

As used in the following description and claims, it should be understood that the term fiber optic cable includes optical fiber cables, a single optical fiber, multiple optical fiber pairs, and wire electrical cables.

A need exists for an effective mechanism for protecting fiber optic cables from being damaged by other components in the system, for limiting a bend radius of a fiber optic cable, as well as for shielding cables.

One known arrangement for limiting a bend radius of a fiber optic cable includes a cable tie-down point that controls the radius at that point. The drawbacks to this arrangement are that it does not protect the rest of the cable, it does not control the bend at any other point than the attachment point, and it is very large and difficult to move.

Another known arrangement includes a jacketed fiber cable made from of an extruded polymer. This protects the cable along the entire length, but does not limit the bend radii at all points.

Also providing adequate EMI radiation shielding for cables used, for example in computer systems, is a problem. For example, such a problem exists in a computer system where two power cables extend from the front to the rear of a system box. When docking and undocking the power supplies, both AC and DC simultaneously, spiking occurs, where EMI couples to the cables. The EMI may be large enough to cause internal damage, or can cause safety issues if the EMI leaks out of the system. Currently the solution to this problem requires multiple large sheet metal encasings that shield each cable from one another and the rest of the system.

SUMMARY OF THE INVENTION

Principal aspects of the present invention are to provide a method and mechanism for protecting and shielding fiber optic cables and for limiting a bend radius of a fiber optic cable. Other important aspects of the present invention are to provide such method and mechanism for protecting and shielding fiber optic cables and for limiting a bend radius of a fiber optic cable substantially without negative effect and that overcome many of the disadvantages of prior art arrangements.

In brief, a method and modular mechanism are provided for protecting fiber optic cables. The modular mechanism includes an inner member for receiving the fiber optic cable, and an outer container receiving and retaining the inner member, such as, an inner tube and outer tube. The inner member and the outer container have corresponding predefined shapes to create an interference with each other, limiting a bend radius of the fiber optic cable.

In accordance with features of the invention, the inner member includes an elongated cylindrical portion and at least one enlarged end portion having the predefined shape for creating interference with the outer container. An aperture extends through the elongated cylindrical portion and the enlarged end portion of the inner member for receiving the fiber optic cable. The container member includes a mating pair of outer members, each having corresponding interior cavity recessed portions for receiving the elongated cylindrical portion and the enlarged end portion of the inner member. The outer members are positioned onto the inner member and are joined together in mating engagement.

In accordance with features of the invention, the modular mechanism fully encases the fiber optic cable at selected locations along the length of the fiber optic cable or the entire length of the fiber optic cable. Multiple modular mechanisms are joined together with the outer members joined together end-to-end in mating engagement to define a straight rigid section or are spaced apart to define individual sections that are free to rotate.

In accordance with features of the invention, the inner member and the interlocking outer members are molded members, formed of a selected material having sufficient strength for protecting the fiber optic cable, such as a plastic material. Either the inner member or the interlocking outer members, or both the inner member and the interlocking outer members can be formed with metal fiber or carbon fiber inserted into the selected material during the molding processes, or a ferrite core material could be formed together with or molded into the interlocking outer members, to provide electromagnetic interference (EMI) shielding.

In accordance with features of the invention, the inner member is a threaded member enabling easy mounting and connecting, for example, to a chassis or circuit board. The inner member and the interlocking outer members are provided in a range of sizes, and are made conductive to provide for EMI shielding and grounding, for a particular application.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment, a modular mechanism is provided for protecting and for limiting a bend radius of a fiber optic cable while at the same time allowing for free movement where required. The modular fiber cable shielding mechanism includes an inner member and an outer container receiving and retaining the inner member, such as, an inner tube and outer tube. The outer tube is mounted onto the inner tube and is free to rotate until the user locks the tubes where the tubes are locked in either a straight or curved position, or the tubes can be left unlocked to rotate freely. Extending through the inside of the inner member and outer connected tubes is an optical fiber cable or a wire electrical cable.

In accordance with features of the preferred embodiments, the modular fiber cable protecting mechanism can be used with or apply to a single fiber or a cluster of fibers. The modular fiber cable protecting mechanism can protect the entire length of the cable from being damaged by other components or can be provided around the cable at selected locations along the length of the cable. The modular fiber cable protecting mechanism enables the cable to be straight or bent at many different angles and the bend radius is set at any point along the cable.

Figure 1:
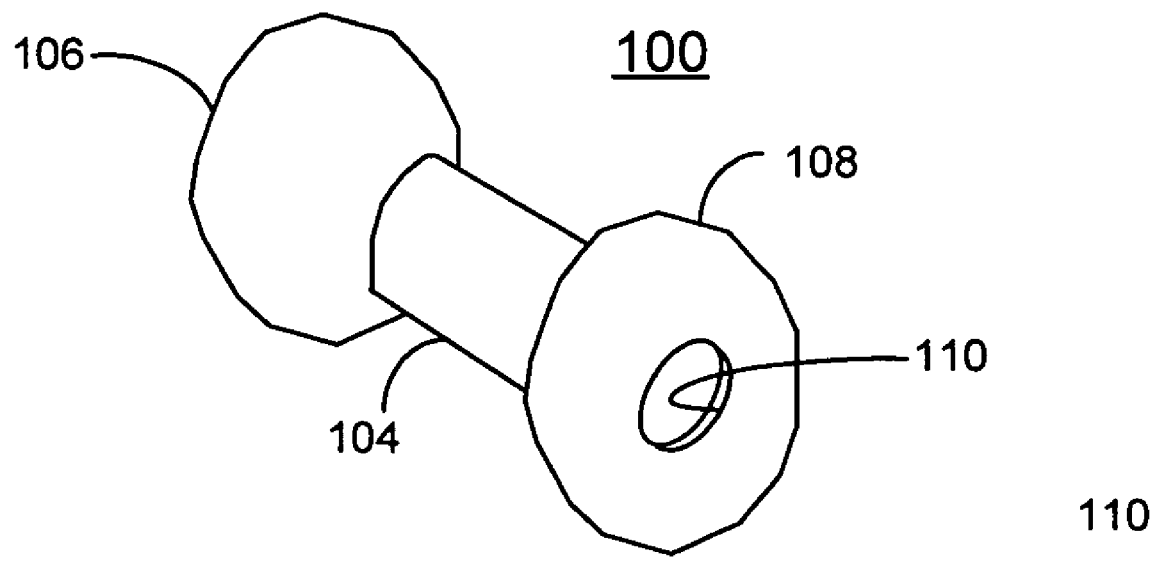
FIG. 1 illustrates not to scale a first exemplary inner member of a modular mechanism for shielding and for limiting a bend radius of a fiber optic cable in accordance with the preferred embodiment.
Figure 2:
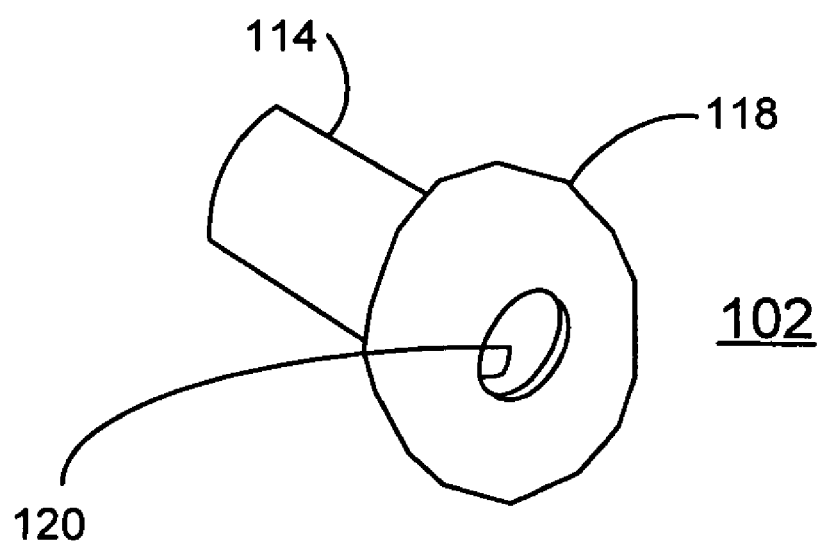
FIG. 2 illustrates not to scale a second exemplary inner member of a modular mechanism for shielding and for limiting a bend radius of a fiber optic cable in accordance with the preferred embodiment.

Having reference now to the drawings, in FIGS. 1 and 2, there are shown respectively a first exemplary inner member generally designated by the reference character 100 and a second exemplary inner member generally designated by the reference character 102 of a modular mechanism for shielding and for limiting a bend radius of a fiber optic cable while at the same time allowing for free movement where required in accordance with the preferred embodiments. The inner member 100 has an overall dumbbell style and the inner member 102 has an overall screw style.

Figure 5:
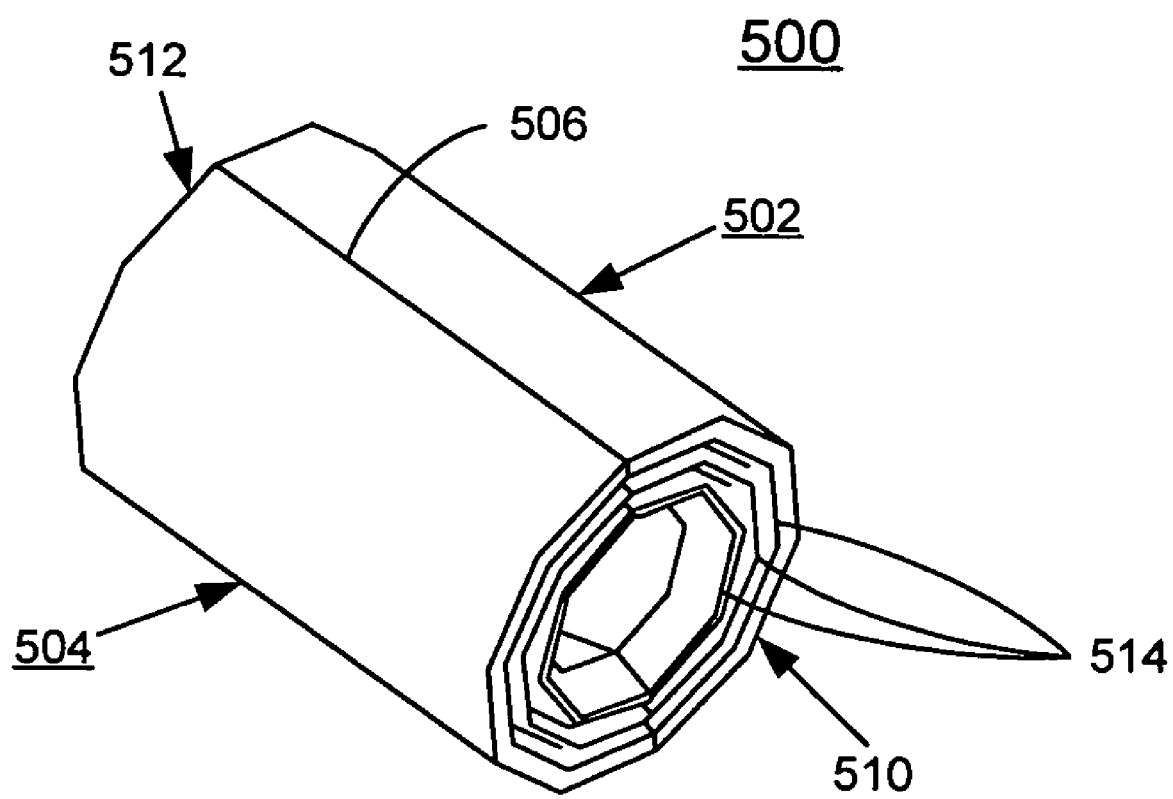
FIG. 5 illustrates not to scale an exemplary outer container adapted to receive and retain a respective first or second inner member to define the modular mechanism for shielding and for limiting a bend radius of a fiber optic cable while at the same time allowing for free movement where required in accordance with the preferred embodiment.

The inner member 100 includes an elongated cylindrical portion 104 and a pair of opposing enlarged end portions 106, 108 having the predefined shape for creating interference with an outer container, such as illustrated and described with respect to FIG. 5. An aperture 110 extends through the elongated cylindrical portion 104 and the enlarged end portions 106, 108 of the inner member 100 for receiving the fiber optic cable, such as illustrated and described with respect to FIGS. 10A, and 10B.

Referring to FIG. 2, the inner member 102 includes an elongated cylindrical portion 114 and an enlarged end portion 118 having the predefined shape for creating interference within an outer container, such as illustrated and described with respect to FIG. 5. An aperture 120 extends through the elongated cylindrical portion 114 and the enlarged end portion 118 of the inner member 102 for receiving the fiber optic cable, such as illustrated and described with respect to FIGS. 10A, and 10B.

Figure 3:
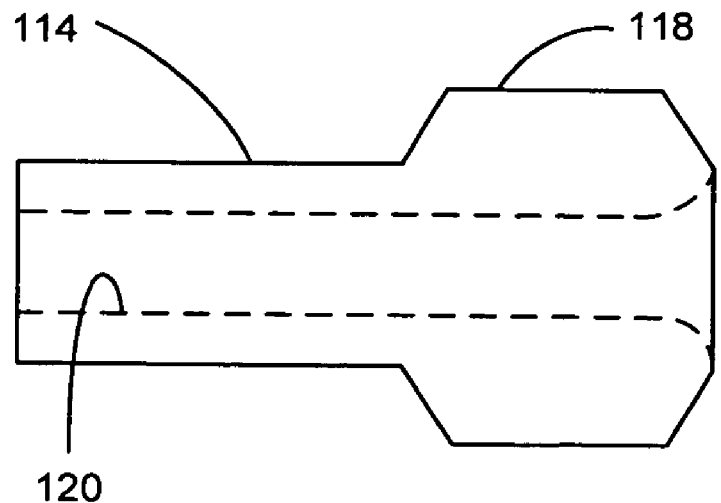
FIGS. 3 and 4 are respective exemplary side and end views not to scale of an exemplary second inner member of a modular mechanism for shielding and for limiting a bend radius of a fiber optic cable while at the same time allowing for free movement where required in accordance with the preferred embodiment.
Figure 4:
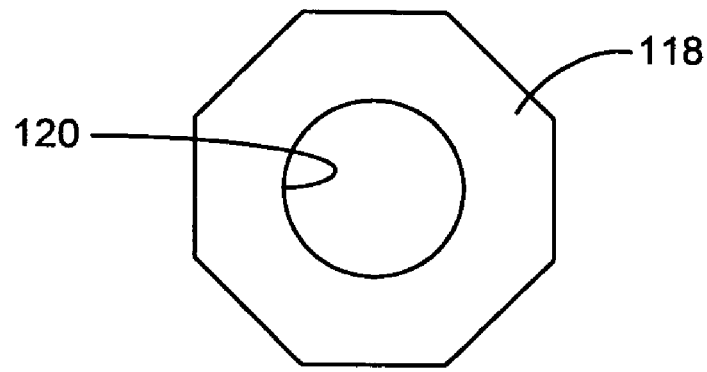

Referring to FIGS. 3 and 4, there are shown respective exemplary side and end views not to scale for the exemplary second inner member 102.

It should be understood that the present invention is not limited to the illustrated inner members 100, 102, various different sizes and various different shapes can be provided for the inner member 100, 102 together with a correspondingly arranged outer container for creating interference with each other, to form a modular mechanism in accordance with the preferred embodiments.

Referring now to FIG. 3, the enlarged end portion 118 of the inner member 102 has a predefined size including a defined length and height. For example, as shown the predefined shape of the enlarged end portion 118 of the inner member 102 includes a tapered opening of aperture 120 to facilitate insertion of an associated fiber optic cable.

Referring now to FIG. 4, as shown the enlarged end portion 118 of the inner member 102 has, for example, an overall octagon shape while various different shapes can be provided. Aperture 120 has a circular shape and similarly various different sizes and shapes can be provided for aperture 120 based upon a particular application.

Referring to FIG. 5, there is shown an exemplary outer container generally designated by the reference character 500 in accordance with the preferred embodiment. Outer container 500 is adapted to receive and retain a respective first or second inner member 100, 102 to define the modular mechanism for shielding and for limiting a bend radius of a fiber optic cable in accordance with the preferred embodiment.

Outer container 500 includes a mating pair of outer members 502, 504, each having corresponding interior cavity recessed portions (not shown) for receiving either the elongated cylindrical portion 104 and the enlarged end portions 106, 108 of the inner member 100, or the cylindrical portion 114 and the enlarged end portion 116 of the inner member 102. The outer members 502, 504 are positioned onto the inner member 100 or the inner member 102 and are joined together in side-to-side mating engagement, along a mating face indicated by 506, such as by press-fit engagement. Each of the outer members 502, 504 includes opposing ends indicated by 510, 512 that are arranged to be joined together end-to-end in mating engagement, such as press-fit engagement with another mating modular mechanism, such as illustrated and described with respect to FIG. 10A.

The outer member ends 510, 512 include a finite set of ribs 514 that are arranged to limit the bend radius, for example, 10, 20, or 30 degrees. The plurality of ribs 514 are arranged for example, much like a zip tie, located on the ends of the outer members 502, 504 so that when bending, the ribs 514 would interlock with each other. The plurality of ribs 514 are arranged to interlock with the ribs 514 of a next end-to-end connected outer container 500.

In accordance with features of the preferred embodiments, the geometry of both inner tubes 100 and 102, and outer tube 500 also is provided to create an interference with each other, thus limiting the bend radius of the optical fiber. For example, the minimum bend radius of optical fiber is generally 30 mm.

It should be understood that in accordance with the preferred embodiments of the present invention, a connection system with modular mechanisms can be arranged to function similar to the dumbbell style inner member 100 where the user would lock the position of the fiber optic cable, either bent or straight, the user would twist an outer container or outer tube around the inner member and the inner tube can be arranged to capture the outer tube and lock its position.

Figure 6:
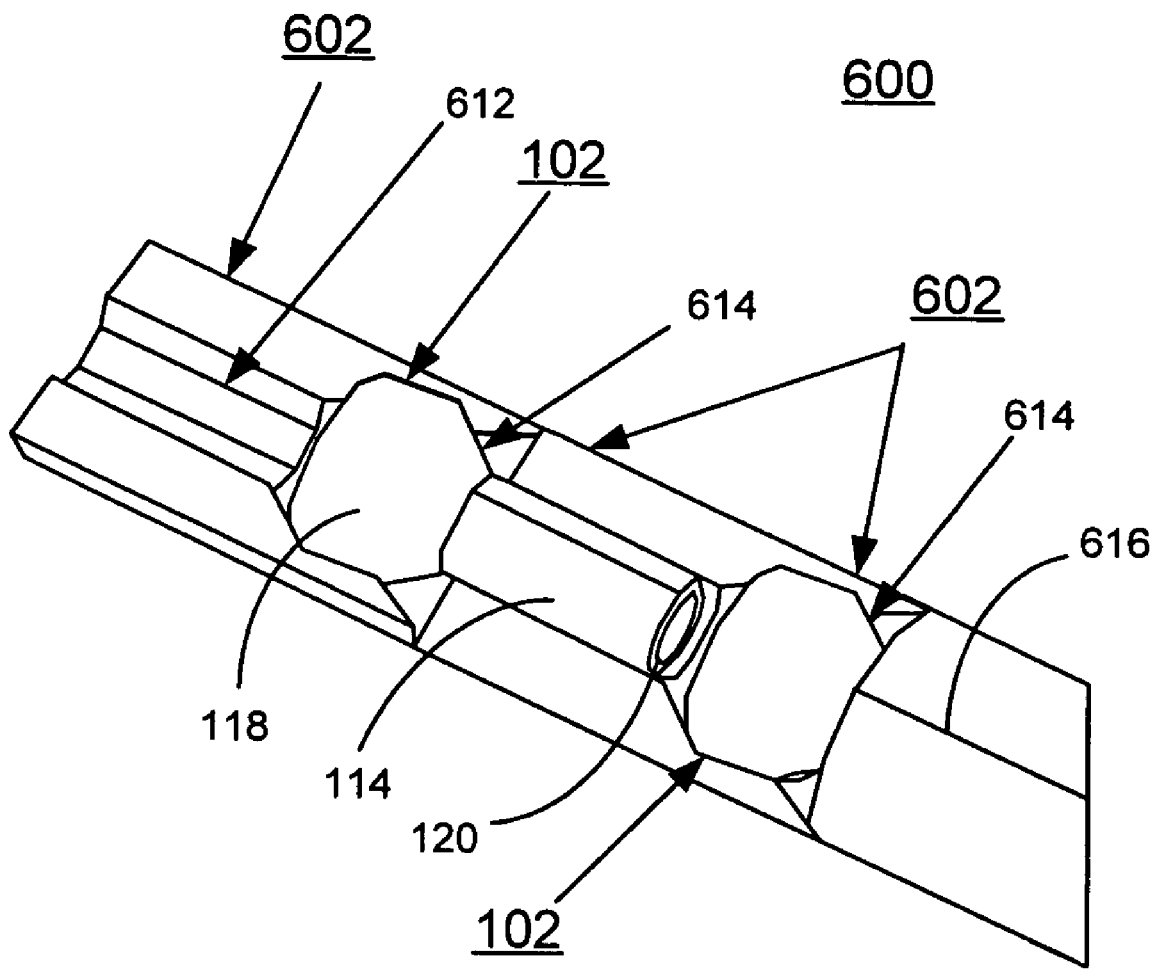
FIG. 6 illustrates not to scale interior details of exemplary outer containers receiving and retaining a respective second inner member in a straight arrangement of multiple modular mechanisms, each modular mechanism for shielding and for limiting a bend radius of a fiber optic cable in accordance with the preferred embodiment.

Referring now to FIG. 6 there is shown a straight arrangement of multiple modular mechanisms generally designated by the reference character 600. As shown, portions of the outer containers 602 are removed to show interior details of exemplary outer container 602 receiving and retaining a respective second inner member 102 to define the straight arrangement of multiple modular mechanisms 600 for shielding and for limiting a bend radius of a fiber optic cable in accordance with the preferred embodiment.

As shown in FIG. 6, outer members defining the outer containers 602 include a corresponding interior recessed portion 612 for receiving the cylindrical portion 114 of the second inner member 102 and a corresponding interior recessed portion 614 for receiving the enlarged end portion 118 of the second inner member 102. A portion of a side mating face 616 is shown for one of the illustrated outer containers 602. The inner tubes and outer containers 102, 602 fully encase an associated portion of the optical fiber cable (not shown).

In accordance with features of the preferred embodiments, the straight arrangement of multiple modular fiber cable protecting mechanisms 600 protects the enclosed associated fiber optic cable from damage, including for example, damage from a crushing force, sharp edges, and the like. The arrangement of multiple modular fiber cable protecting mechanisms 600 also serves as a retention device. If a foreign object pulls on the optical fiber cable, the arrangement of the modular fiber cable protecting mechanisms 600 would take the brunt of the pulling forces thus keeping the cable/fiber protected and located correctly.

Figure 7:
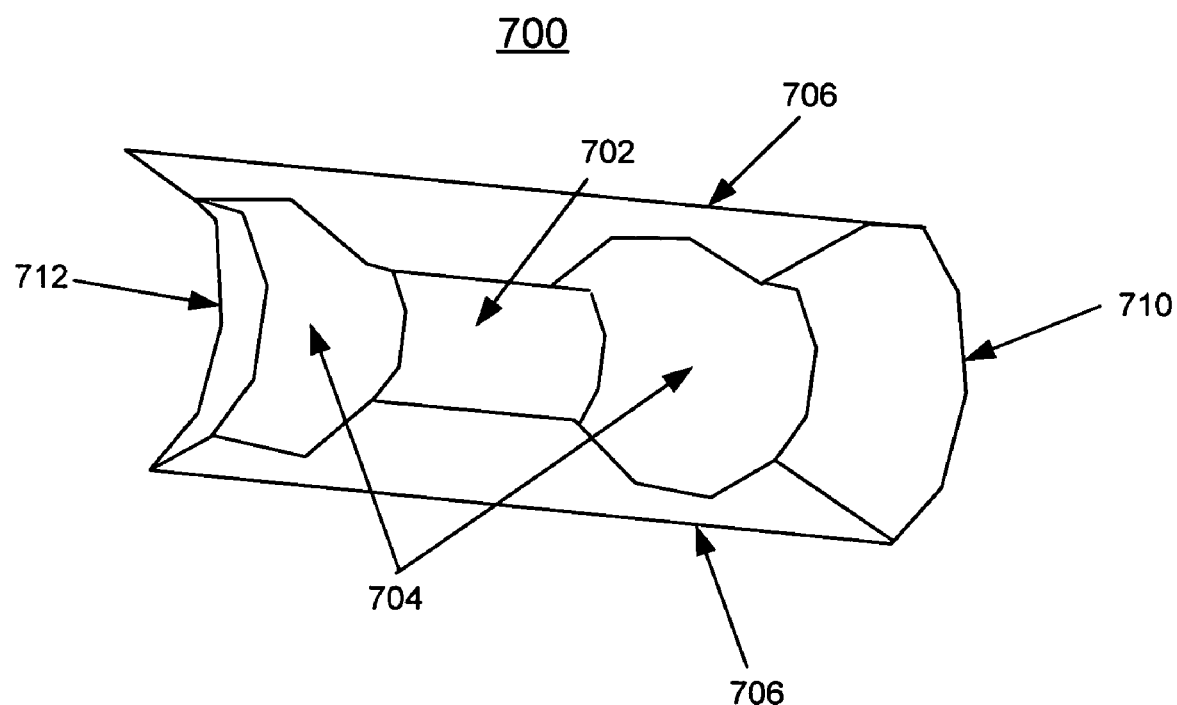
FIG. 7 illustrates not to scale interior details of an exemplary outer container member for receiving and retaining a first inner member, or portions of a pair of second inner members, to define the modular mechanism for shielding and for limiting a bend radius of a fiber optic cable in accordance with the preferred embodiment.

Referring now to FIG. 7, there are shown interior details of an exemplary outer container member generally designated by the reference character 700 for receiving and retaining portions 108 of a pair of the first dumbbell inner members 100, portions 118 of a pair of second inner members 102, to define the modular mechanism for shielding and for limiting a bend radius of a fiber optic cable in accordance with the preferred embodiment.

Outer container member 700 includes a first interior recessed portion 702 defining an aperture for receiving an associated fiber optic cable (not shown) between the pair of first inner members 100. Outer container member 700 includes a pair of corresponding interior recessed portions 704 for receiving the respective enlarged end portions 108 of the pair of first inner members 100. Each of the first inner members 100 has the elongated cylindrical portion 104 and opposed enlarged end portion 108 extending outwardly from the outer container member 700.

Alternatively, portions 118 of a pair of second inner members 102 are received within the respective corresponding interior recessed portions 704 of the outer container member 700. Each of the second inner members 102 has the elongated cylindrical portion 114 extending outwardly from the outer container member 700. For example, the outwardly extending elongated cylindrical portion 114 can be used for a junction connection, such as with a chassis or circuit board. Also the outwardly extending elongated cylindrical portion 114 can be received within another outer container member, such as the exemplary outer container member 800 illustrated and described with respect to FIG. 8. An associated fiber optic cable (not shown) extends through the corresponding interior recessed portion 702 between the pair of second inner members 102.

A pair of side mating faces 706 is joined in side-to-side mating engagement with a pair of side mating faces 706 of a mating outer container member 700. Each of a pair of opposed end mating faces 710, 712 is arranged for end-to-end mating engagement with other modular mechanisms in accordance with the preferred embodiment.

Figure 8:
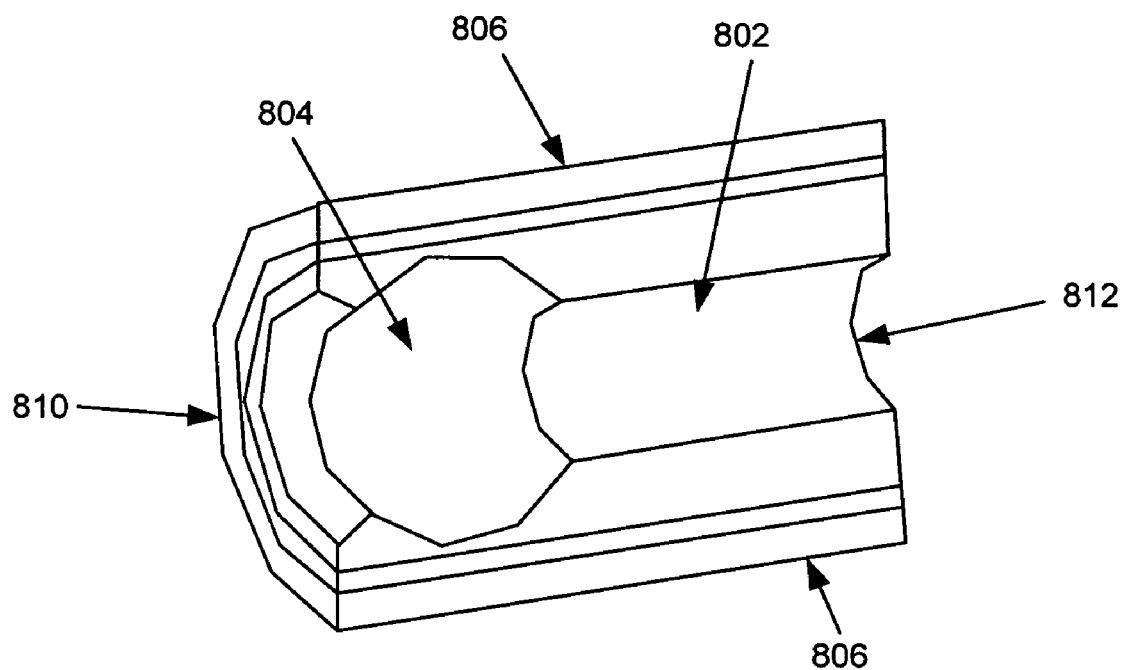
FIG. 8 illustrates not to scale interior details of another exemplary outer container member for receiving and retaining a second inner member to define the modular mechanism for shielding and for limiting a bend radius of a fiber optic cable while at the same time allowing for free movement where required in accordance with the preferred embodiment.

Referring now to FIG. 8, there are shown interior details of another exemplary outer container member generally designated by the reference character 800 for receiving and retaining a second inner member to define the modular mechanism for shielding and for limiting a bend radius of a fiber optic cable in accordance with the preferred embodiment.

Outer container member 800 includes a corresponding interior recessed portion 802 for receiving the cylindrical portion 114 of the second screw type inner member 102 and a corresponding interior recessed portions 804 for receiving the enlarged end portion 118 of the second inner member 102. A pair of side mating faces 806 is joined in side-to-side mating engagement with a pair of side mating faces 806 of a mating outer container member 800. Each of a pair of opposed end mating faces 810, 812 is arranged for end-to-end mating engagement with other modular mechanisms in accordance with the preferred embodiment.

The inner member 100, 102 and the interlocking outer members 502, 504 are molded members, formed of a selected material having sufficient strength for protecting the fiber optic cable, such as a plastic material. Either the inner member 100, 102 or the interlocking outer members 502, 504, or both the inner member 100, 102 and the interlocking outer members 502, 504 can be formed with metal fiber or carbon fiber inserted into the selected material during the molding processes, or a ferrite core material could be formed on the exterior of the interlocking outer members or formed into the interior portions of the interlocking outer members, to provide electromagnetic interference (EMI) shielding.

In accordance with features of the preferred embodiments, the inner member 102 is a threaded enabling easy mounting and connecting, for example, to a chassis or circuit board. The respective inner members 100, 102 and the interlocking outer members 502, 504 are provided in a range of sizes, and are made conductive to provide for EMI shielding and grounding, for particular application.

A plastic material can be used for molding the respective inner members 100, 102 and the interlocking outer members 502, 504 to provide adequate fiber protection. To provide electromagnetic interference (EMI) shielding for cables, a selected electrically conductive material, such as metal fiber, carbon fiber, and ferrite core material, is inserted into the mold material, for example to limit various frequencies for noise elimination in cables. Ferrite core material also is selectively formed on an exterior or interior portion of the outer container 500 for providing an EMC/EMI shield for cables.

When molding the inner tubes 102, 102 and outer container members 502, 504 either metal fiber or carbon fiber, or both metal fiber and carbon fiber optionally are inserted into materials used for the molding processes. The outer member 502, 504 could also have further defined recessed areas where ferrite core material could be inserted, or molded. This would adequately shield EMI radiation that otherwise couples to the electrical cables.

Figure 9:
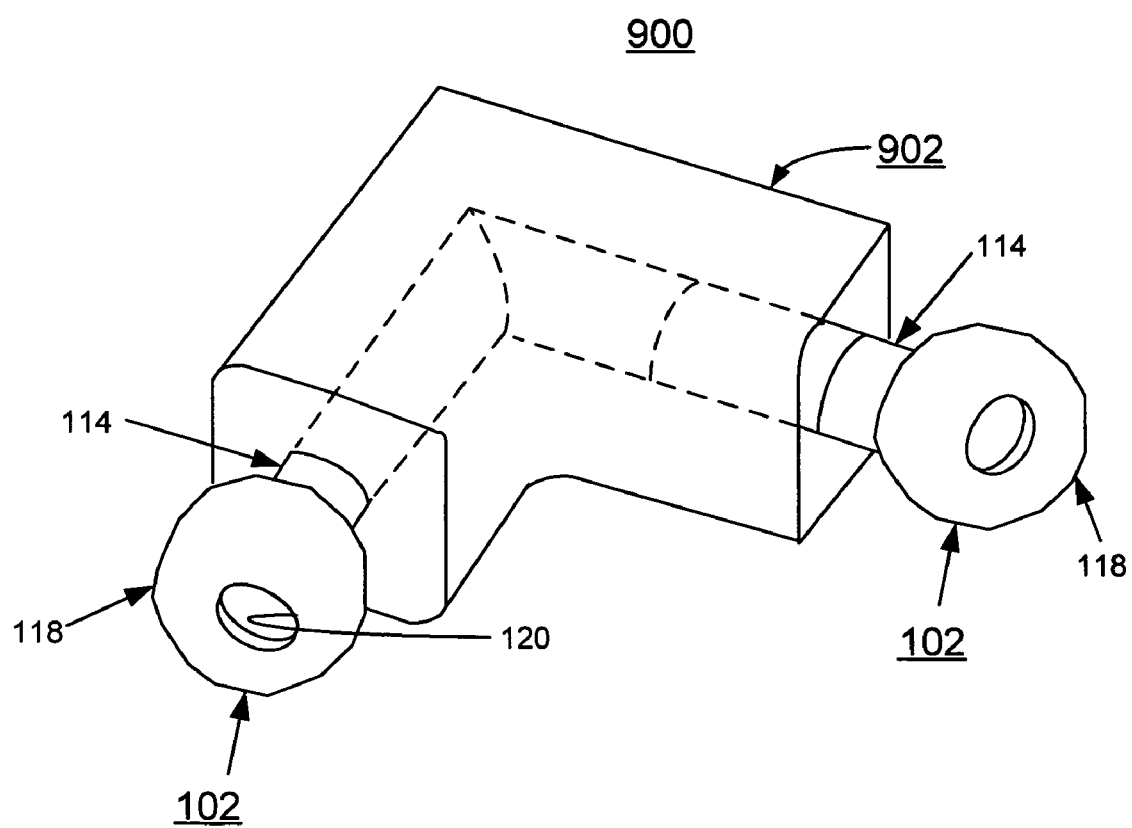
FIG. 9 illustrates not to scale use of a pair of the second inner members for connecting a fiber optic cable together with a light pipe 90 degree junction member in accordance with the preferred embodiment.

Referring now to FIG. 9, there is shown a connection arrangement generally designated by the reference character 900 including a pair of the second inner members 102 for connecting an associated fiber optic cable (not shown) together with a 90 degree junction member 902, such as light pipe 90 degree junction member 902 in accordance with the preferred embodiment. The light pipe 90 degree attachment arrangement 900 is used when using light fiber, where there may not have the room for the fiber to make a 90 degree turn with the limited bend radius.

For example, using the threaded properties of inner screw type member 102 enables easy attachment to anything with a threaded hole and could be advantageous for mounting fiber directly to a circuit board, mounting cables directly to tailstocks, chassis, and the like.

Figure 10A:
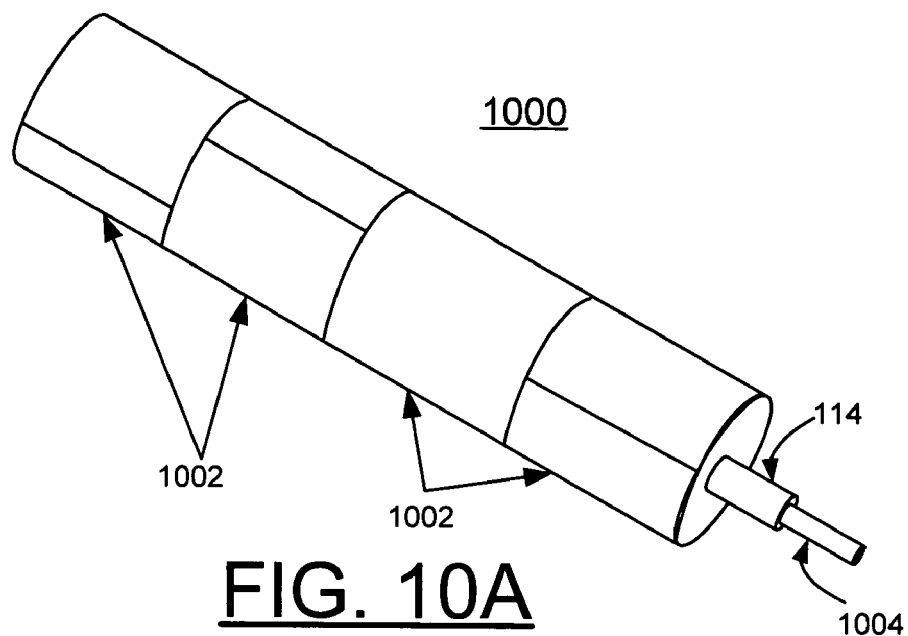
FIGS. 10A and 10B are respective views not to scale illustrating an exemplary straight arrangement and an exemplary curved arrangement of multiple modular mechanisms in accordance with the preferred embodiment.
Figure 10B:
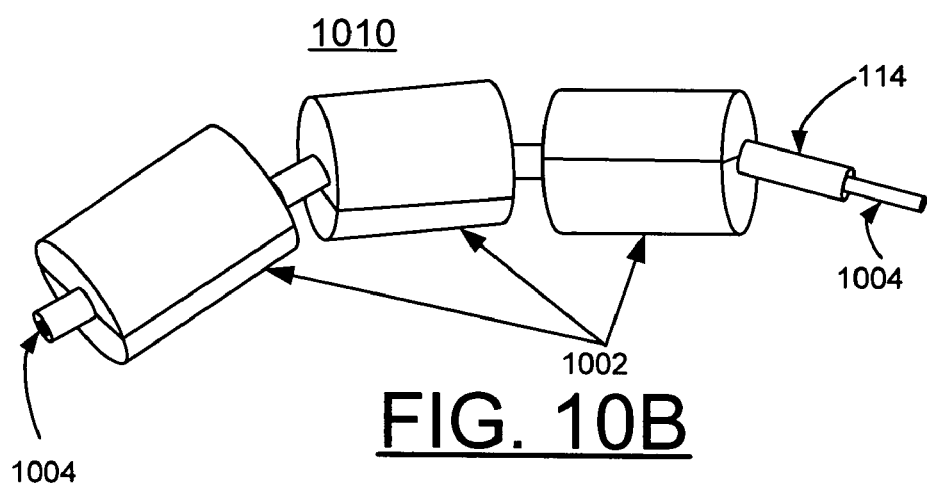

Referring now to FIGS. 10A and 10B, there are shown respectively an exemplary straight arrangement generally designated by the reference character 1000 and an exemplary curved arrangement generally designated by the reference character 1010 of multiple modular mechanisms 1002 in accordance with the preferred embodiment.

As shown in FIGS. 10A and 10B, advantages of the modular mechanisms 1002 include that protection is enabled along the entire length of a fiber optic cable 1004, such as shown in the straight arrangement 1000 or at defined locations along the length of the fiber optic cable 1004, such as shown in the curved arrangement 1010.

The interlocking pieces including inner members 100, 102, and corresponding outer container members 502, 504, 700, 800 used for forming the modular mechanisms 1002 of the preferred embodiment can be provided in a range of sizes and optionally also can be made conductive to provide for EMC/EMI shielding and grounding. The individual modular mechanisms 1002 are free to rotate unless a rigid section is needed, in which case modular mechanisms 1002 can be arranged or locked into a rigid shape as desired, with both rigid sections and sections that are free to move provided to match a particular design application.

While the present invention has been described with reference to the details of the embodiments of the invention shown in the drawing, these details are not intended to limit the scope of the invention as claimed in the appended claims.

What is claimed is:

1. A modular mechanism for protecting fiber optic cables comprising:
   an inner member; an aperture extending through said inner member for receiving the fiber optic cable,
   an outer container receiving and retaining the inner member;
   said inner member and said outer container having respective predefined shaped portions to create an interference with each other for limiting a bend radius of the fiber optic cable; and
   said outer container including a mating pair of outer members, and wherein multiple modular mechanisms are joined together with the outer members joined together end-to-end in mating engagement to define a straight rigid section.

2. A modular mechanism for protecting fiber optic cables as recited in claim 1 wherein said inner member and said outer container members are formed by a molding process.

3. A modular mechanism for protecting fiber optic cables as recited in claim 1 wherein each of said inner member and said outer container members are unitary, molded members formed of a selected electrically insulative material having electrically conductive material inserted into the selected electrically insulative material.

4. A modular mechanism for protecting fiber optic cables as recited in claim 3 wherein said electrically insulative material is a plastic material.

5. A modular mechanism for protecting fiber optic cables as recited in claim 3 wherein said electrically conductive material includes a selected one of metal fiber, carbon fiber, and ferrite core material.

6. A modular mechanism for protecting fiber optic cables as recited in claim 1 wherein said inner member includes an elongated cylindrical portion and at least one enlarged end portion having said predefined shaped portion for creating interference with said outer container.

7. A modular mechanism for protecting fiber optic cables as recited in claim 6 wherein each of said mating pair of outer members has corresponding interior cavity recessed portions for receiving the elongated cylindrical portion and said at least one enlarged end portion of said inner member.

8. A modular mechanism for protecting fiber optic cables as recited in claim 7 wherein said mating pair of outer members are positioned onto said inner member and are joined together in press-fit mating engagement.

9. A modular mechanism for protecting fiber optic cables as recited in claim 1 wherein the fiber optic cable is fully encased at selected locations along the length of the fiber optic cable.

10. A modular mechanism for protecting fiber optic cables as recited in claim 1 wherein the fiber optic cable is fully encased along the length of the fiber optic cable.

11. A modular mechanism for protecting fiber optic cables comprising:
    an inner member; an aperture extending through said inner member for receiving the fiber optic cable,
    an outer container receiving and retaining the inner member;
    said inner member and said outer container member having respective predefined shaped portions to create an interference with each other for limiting a bend radius of the fiber optic cable;
    said outer container including a mating pair of outer members, and
    said outer members including ends having a plurality of ribs for interlocking engagement with the ribs of a next end-to-end connected outer container.

12. A modular mechanism for protecting fiber optic cables as recited in claim 11 wherein said inner member and said pair of outer members are molded members formed of a selected material having sufficient strength for protecting the fiber optic cable.

13. A modular mechanism for protecting fiber optic cables as recited in claim 12 wherein said outer members are formed with metal fiber or carbon fiber inserted into the selected material to provide electromagnetic interference (EMI) shielding.

14. A modular mechanism for protecting fiber optic cables as recited in claim 12 wherein a ferrite core material is inserted into an interior cavity portions of said outer members to provide electromagnetic interference (EMI) shielding.

15. A modular mechanism for protecting fiber optic cables as recited in claim 11 wherein said inner member is a threaded member to enable mounting and connecting to a chassis or circuit board.

16. A modular mechanism for protecting fiber optic cables as recited in claim 11 wherein said inner member and said outer members are made electrically conductive to provide for EMI shielding and grounding.

17. A modular mechanism for protecting fiber optic cables as recited in claim 11 wherein a ferrite core material is formed with said outer members to provide for EMI shielding and grounding.

18. A method using a modular mechanism for protecting fiber optic cables comprising:

forming an inner member of the modular mechanism with an aperture extending through said inner member for receiving the fiber optic cable, providing an outer container to receive and retain the inner member; and defining respective predefined shaped portions of said inner member and said outer container to create interference with each other for limiting a bend radius of the fiber optic cable; and providing a mating pair of outer members to define said outer container and defining ends of said outer members with a plurality of ribs for interlocking engagement with the ribs of a next end-to-end connected outer container.

* * * * *